V. H. GREGORY.
GLASS FURNACE.
APPLICATION FILED FEB. 20, 1912.
1,151,942.
Patented Aug. 31, 1915.
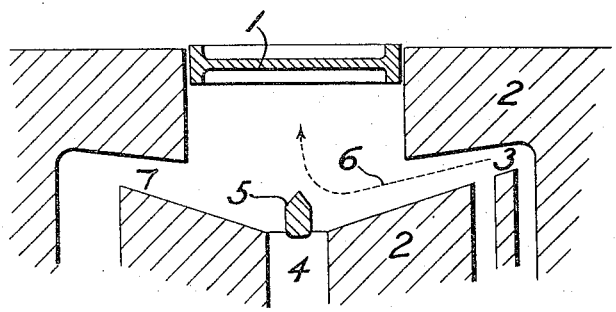
Witnesses
Inventor
Victor Herbert Gregory
per
Rogers, Kennedy & Campbell Attorneys

UNITED STATES PATENT OFFICE.

VICTOR HERBERT GREGORY, OF CHISWICK, ENGLAND, ASSIGNOR TO PILKINGTON BROTHERS, LIMITED, OF ST. HELENS, ENGLAND.

GLASS-FURNACE.

1,151,942.     Specification of Letters Patent.     Patented Aug. 31, 1915.

Application filed February 20, 1912. Serial No. 678,780.

*To all whom it may concern:*

Be it known that I, VICTOR HERBERT GREGORY, a subject of the King of the United Kingdom of Great Britain and Ireland, and residing at 59 Park road, Chiswick, Middlesex, England, have invented new and useful Improvements in or Relating to Glass-Furnaces, of which the following is a specification.

This invention is for improvements in furnaces for heating the reversible pots from which glass is drawn. When the pot is reversed the glass remaining in it falls to the bottom of the furnace where there is a hole to lead it out of the furnace. It has been found necessary to direct a portion of the gases entering the furnace on to the bottom of the furnace in order to keep the glass sufficiently liquid to flow through the hole without blocking it up.

A furnace has hitherto been constructed in which the floors of the ports leading the gases into the furnace incline downward and the gases consequently are directed more or less toward the bottom of the furnace. The greater portion of the gases however are required to be directed against the underside of the pot and to effect this a firebrick deflector has been fixed in front of the mouth of the gas port to direct the gases upward. Such deflector however, for the reason stated, did not deflect the whole of the gases upward because a passage had to be left beneath it through which a portion of the gases could reach the bottom of the furnace. This latter portion of the gases was to a great extent wasted because it did not serve to heat the pot and the present invention has for its object a construction of furnace in which all the gases entering the furnace, as distinguished from part only of the gases as in the before mentioned known arrangement are directed against the underside of the pot while by the same means the glass on the bottom of the furnace is kept sufficiently hot to flow out of the furnace. The construction moreover has the advantage that the gases are distributed evenly over the underside of the pot.

The accompanying drawing shows a vertical section of a furnace constructed according to this invention, and in the drawings, 1 is the pot, 2 is the body of the furnace, 3 is the port which admits a mixture of gas and air, 4 is the hole through which the glass flows out of the furnace, and 7 is the port by which the gases leave the furnace and which is sealed to prevent the escape of gas therethrough.

A bridge or deflector 5 of firebrick or other refractory material is fixed across the hole 4, so that its length is perpendicular to the direction of flow of the inlet gases and therefore prevents the gases flowing from the inlet port 3 along the bottom of the furnace to the outlet port 7. This bridge 5 is of such width and so shaped as to allow a free passage for the glass to flow into the hole 4 on each side of the bridge, and it is so situated and shaped as to prevent the passage of any appreciable amount of gas underneath it, and to deflect the gases approximately evenly over the underside of the pot. The gases, in passing over the top of the bridge 5, heat it to a high temperature and the bridge keeps the glass which falls on to it and the glass close to it at the edges of the hole 4, sufficiently liquid to flow through the hole. At the same time it will be seen that all the gases issuing from the port 3 are directed, as indicated by the dotted line 6, toward the pot, from a point immediately below it, with the result that, first, by suitably shaping and placing the bridge 5, the gases can be evenly distributed over the underside of the pot and secondly, the gases impinge on the pot in a direction approximately perpendicular to its under surface and so, by promoting a vigorous circulation of the gases, bring all the hottest gases into contact with the pot before they leave the furnace.

It has been found that great economy in the amount of gas required to heat the pot results from the construction of furnace shown, as compared with the known construction in which a deflector is fixed in front of the mouth of the port with a passage beneath it to allow a portion of the gas to reach the hole 4.

The best position for the deflector 5, which need not necessarily bridge the hole 4, depends on the exact shape of the furnace and the direction of the entering gases, and the invention is not confined to the position and shape of the deflector 5, provided that it be close enough to the outlet for the glass to keep the glass sufficiently liquid to flow out of the furnace, and be so placed and so shaped as to deflect all the gases against the underside of the pot.

I claim:—

In a furnace for heating a reversible pot from which glass is drawn, the combination with a downwardly inclined lateral port admitting gas into the furnace, an outlet for glass but not for gas in the bottom, and a lateral outlet for the gases, of a deflector across the outlet for glass in the path of the incoming gases, and surfaces on the deflector directing the gases impinging thereon toward the underside of the pot.

In witness whereof I have hereunto set my hand in the presence of two witnesses.

VICTOR HERBERT GREGORY.

Witnesses:
E. H. BAILLIE,
V. McDERMOTT.

Copies of this patent may be obtained for five cents each, by addressing the "Commissioner of Patents, Washington, D. C."